(12) United States Patent
VanDeMar

(10) Patent No.: US 8,627,419 B1
(45) Date of Patent: Jan. 7, 2014

(54) MULTIPLE IMAGE REVERSE TURING TEST

(76) Inventor: Michael J VanDeMar, Largo, FL (US)

( * ) Notice: Subject to any disclaimer, the term of this patent is extended or adjusted under 35 U.S.C. 154(b) by 795 days.

(21) Appl. No.: 12/122,628

(22) Filed: May 16, 2008

Related U.S. Application Data

(60) Provisional application No. 60/931,866, filed on May 25, 2007.

(51) Int. Cl.
*G06F 21/00* (2006.01)

(52) U.S. Cl.
USPC .............................. 726/5; 713/182

(58) Field of Classification Search
USPC ............... 726/2–7, 16–19, 22, 23, 25–29; 713/150, 155, 168; 715/700, 701, 760, 715/764, 769, 770, 809, 810, 846
See application file for complete search history.

(56) References Cited

U.S. PATENT DOCUMENTS

| | | | |
|---|---|---|---|
| 6,195,698 B1 | 2/2001 | Lillibridge et al. | |
| 2004/0199597 A1 | 10/2004 | Libbey et al. | |
| 2004/0230843 A1* | 11/2004 | Jansen | 713/202 |
| 2005/0066201 A1* | 3/2005 | Goodman et al. | 713/202 |
| 2005/0114705 A1* | 5/2005 | Reshef et al. | 713/201 |
| 2005/0120201 A1 | 6/2005 | Benaloh et al. | |
| 2005/0138376 A1* | 6/2005 | Fritz et al. | 713/168 |
| 2007/0094717 A1* | 4/2007 | Srinivasan et al. | 726/5 |
| 2007/0201745 A1 | 8/2007 | Wang | |
| 2007/0250920 A1* | 10/2007 | Lindsay | 726/7 |
| 2008/0066014 A1 | 3/2008 | Misra | |
| 2008/0301778 A1* | 12/2008 | Fritz et al. | 726/4 |

* cited by examiner

*Primary Examiner* — Gilberto Barron, Jr.
*Assistant Examiner* — Abdulhakim Nobahar
(74) *Attorney, Agent, or Firm* — Tiffany C. Miller

(57) ABSTRACT

In a Reverse Turing Test an applicant seeking access to a computer process is presented with an image containing human-readable data that is intended to be inaccessible to an automated process or bot. In an improved Reverse Turing Test the applicant is presented with multiple sub-images that have to be rearranged in order to yield the overall image. This does not substantially increase a human applicant's difficulty in dealing with the test, but makes it much more difficult for a bot to interpret the image.

12 Claims, 4 Drawing Sheets

MULTIPLE IMAGE REVERSE TURING TEST

FIELD OF THE INVENTION

The present invention relates generally to the field of electronic security methods, and in particular to a method for determining whether an applicant for use of a secured computer, computer system or computer process is a human or is an automated process. More specifically, the invention involves human skills of using a combination of image assembly from individual parts and visual recognition of the assembled image.

BACKGROUND OF THE INVENTION

It is often desirable or necessary to determine if a particular applicant seeking to use an electronic service remotely is in fact a human being, and not an automated system. For example, web sites on the Internet that offer access for free to humans but want to restrict automated programs (sometimes referred to as "bots") from abusing their system need a way to distinguish between the two. This is often the case in situations where normal human usage would put an acceptable load on a server that automated processes could easily exceed. Additionally, in many cases bots are designed to use computer system services for purposes that they are not intended for, such as mass registering for free email accounts that are then used to send unsolicited advertising.

Currently, a commonly used automated method for making the determination of whether an applicant for access to a secured service or computer system is a human or is a bot is what is known as a reverse Turing test (RTT). This can involve presenting the applicant with an image (or a data set convertible into an image), which can, for example, contain either a string of characters or a picture of a readily recognizable object, and having the user identify what is presented in the image. Typically the images presented to the users are distorted in an attempt to make it more difficult for Optical Character Recognition (OCR) software, and other visual recognition programs, to determine what the image is (thereby allowing automated systems to fool the process of identifying whether a user is in fact human). One of the problems being encountered is that as the methods for identifying text and images by computer programs advance, the images must be obfuscated or distorted more and more, increasing the difficulty for a human user to identify the images as well. Therefore a method of increasing the difficulty for a machine or bot to pass an RTT, without increasing the difficulty for a human user, is highly desirable.

SUMMARY OF THE INVENTION

A method of distinguishing a human user from a machine is provided. The method comprises using an algorithm to generate a data set representative of an image containing data that is visually identifiable by a human. The image is divided into multiple sub-images. In a preferred embodiment the data set comprising the sub-images is then communicated to the applicant's computer where all the sub-images are preferably presented simultaneously by means of a graphic user interface (GUI) that provides means to manipulate the positioning, size, or alignment of the various sub images. This may be done, for example by recourse to a Dynamic Hypertext Markup Language (DHTML) web page, a Flash multimedia program, or a web page written in some future standard of HTML or other web layout language that inherently allows for the user to reposition and manipulate elements contained within it. Through the use of a keyboard, mouse, or similar input device conventionally used with a human user's computer, a human applicant can manipulate the position, alignment, and rotation of the sub-images in such a way that the original image can be reassembled.

A human applicant can reassemble the image and indicate to the security process that he or she recognizes the data. This may be done through actions such as inputting data contained within the reassembled image or by following directions contained within the data. That user interaction is then received and interpreted. A determination of whether the user is a human or not is made based on a comparison between what the user inputs and what data the original image contained.

The additional step of requiring the image to be correctly assembled before identification of the data contained within it can be made adds another level of difficulty that image recognition software would have to overcome in order to trick the system into thinking that a human was attempting to make access. This process, however does not substantially increase the effort a human would encounter. Another aspect of preferred embodiments of the present invention is that a method comprising the recited steps of overlaying data and image, chopping up the image, shuffling the pieces and sending the resultant puzzle to a requestor for solving is a method of controlling access to a computer or service in order to inhibit unauthorized use.

BRIEF DESCRIPTION OF THE DRAWINGS

The present invention is illustrated by way of example, and not limitation, in the following figures of the accompanying drawings.

DETAILED DESCRIPTION

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. As noted above, "bot" stands for an algorithmic process that can, to some extent, mimic the behavior of a human seeking access to a service or process furnished by a computer. The words "user" and "applicant" are used more or less interchangeably to denote either a person or a bot seeking access to a computer. Moreover, the phrase "access to a computer" shall stand for any sort of such access including, but not limited to, access to the operating system of a single computer, access to a computer system, access to a process or service operating on one or more computers or to an information service supplied by a computer, regardless of whether it is supplied locally or remotely. Much of the following discussion is couched in terms befitting an internet-based scenario in which an applicant uses a computer to transmit a service request to a remote computer that can grant or deny that request. It will be understood, however, that the methods disclosed herein are not limited to that scenario and do not depend on the details of data transmission. For example, the claimed methods of distinguishing a human applicant from a bot are applicable to a single-computer environment in which the novel method is used to prevent access to a secured program by a viral bot running on the computer. Moreover, those skilled in the art will understand that in the interest of clarity of presentation much of this disclosure is presented in terms of what a human applicant would see on a graphical user interface—i.e., an image or a collection of images—and not in terms of data sets or computer files that a rival bot would process.

Methods of distinguishing a human user from a bot are described. Numerous specific details are set forth in the following description for the purposes of explanation, to aid in a thorough understanding of the present invention. It will be evident, however, to one skilled in the art that the present invention may be practiced without these specific details. It will be appreciated that those skilled in the art will be able to devise various other arrangements, which, although not explicitly described or shown herein, embody the principles of the invention, and are included within its spirit and scope.

Figure 1:
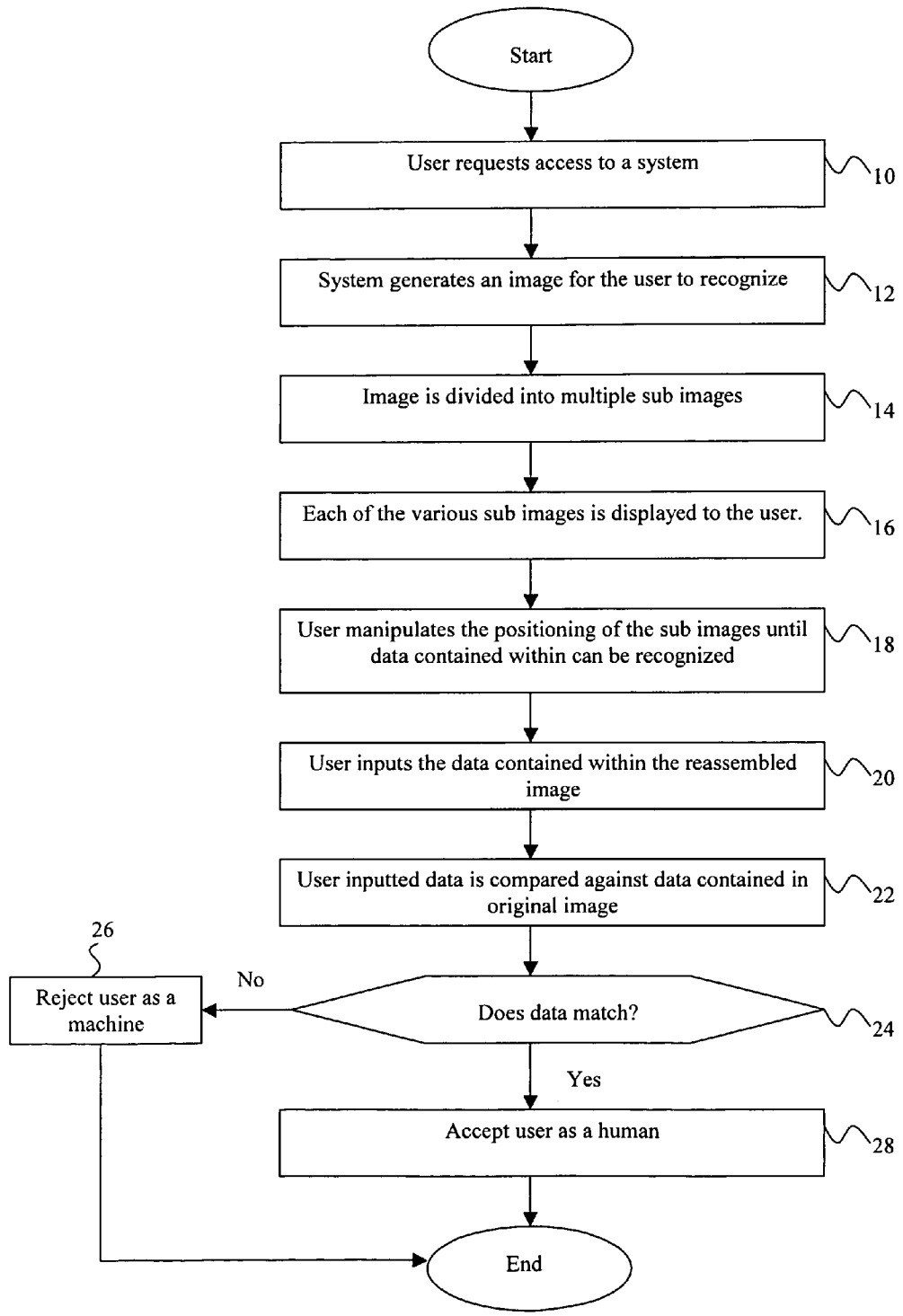
FIG. 1 shows a flowchart of a method for determining whether an applicant is a human or an algorithmic process or bot in accordance with one illustrative embodiment of the present invention.

FIG. 1 shows a flowchart of a method for determining whether a given user is a human or a bot in accordance with one illustrative embodiment of the present invention. In particular, an access request is made by the applicant in step 10. The system generates a data set representative of an image containing reference data in Step 12. This image is divided equally or unequally, with or without rotation, resizing, or inversion into various sub-images (step 14).

The various sub-images are displayed to the user in step 16, generally in a single interface that allows for their position, orientation or size to be individually or collectively manipulated through user input. The sub-images are separated and shuffled, as generally indicated in FIGS. 2-5. Other means of shuffling can include rotating or flipping of the various sub-images along either the x-axis or the y-axis, or resizing of the individual sub-images.

Using available input devices, such as a mouse or other input device attached to a computer, the user arranges the various sub-images until the reference data is evident (step 18). The applicant then inputs that data or responds in such a way indicating that the data contained within the reassembled image is recognized (step 20). The input data or the interaction performed by the user is then compared against the data that was contained within the original image step 22.

The decision as to whether or not the data or interaction received from the user matches the data contained within the original image is made in step 24. If the data does not match, then the user is rejected as being a machine or bot (step 26). If the data does match, then the user is accepted as being human (step 28).

Figure 2:
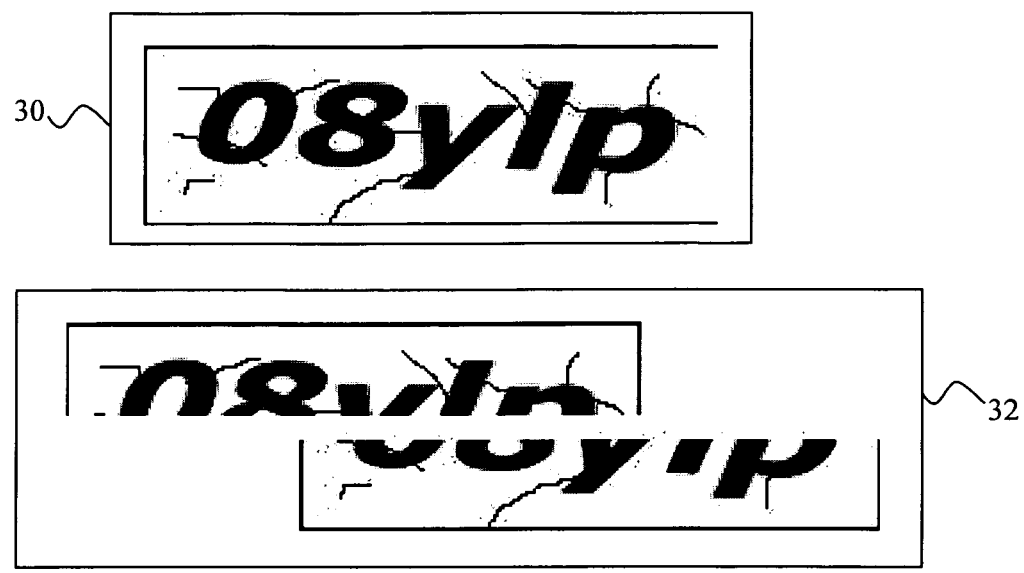
FIG. 2 shows an exemplary method, in accordance with another aspect of the invention, of how a generated image containing human readable reference data might be presented to the user after being divided into upper and lower sections.

FIG. 2 shows an exemplary illustration of an image containing data and that is divided into multiple sub images which are then presented to the user for reassembly. In particular, the original image contains the data for the user to recognize in step 30. The image is then divided into upper and lower portions in step 32.

These separate sub-images are then presented to the user for reassembly by positioning through drag and drop, which is to say selecting with the mouse, dragging them to another location and releasing the mouse to leave the given sub image in the new location.

In this example the upper sub image is aligned horizontally above the lower sub image by the user, after which the user inputs the data contained within the reassembled image. This inputted data is then compared by the system against the data contained within the original image for purposes of making the determination as to whether the user is human or bot.

Figure 3:
FIG. 3 shows an exemplary method, in accordance with another aspect of the invention, of how a generated image containing reference data might be presented to an applicant after being divided in such a way that the middle section is separated from the remainder of the image.

FIG. 3 shows an exemplary illustration of another method of dividing the original visual data-containing image into multiple sub-images, this time by virtue of using image transparencies. Again, the original image contains the data for the user to recognize in step 34. The image is divided in such a way that the horizontal middle section is removed from the original image, and a copy of that middle section is placed on a new image containing a transparent background step in 36.

separate sub-images are presented to the user for reassembly by positioning the sub-image created from the horizontal middle portion of the original image directly over the sub-image that has the middle section removed. After reassembly the user inputs the data contained within the reassembled image, said inputted data is then compared by the system against the data contained in the original image in order to determine if the user is human or bot.

Figure 4:
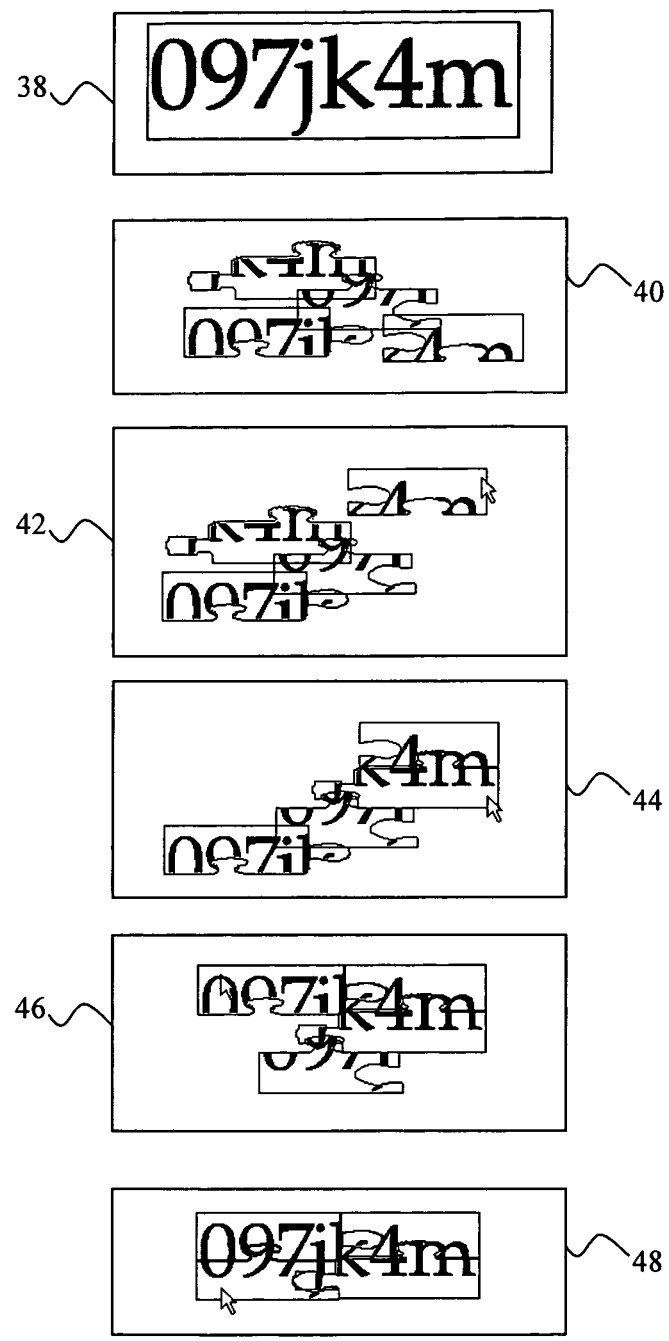
FIG. 4 shows an exemplary method, in accordance with another aspect of the invention, of how a generated image containing reference data might be presented to the user after being divided in such a way that the various sub images resemble, and fit together as, the irregular pieces of a jigsaw puzzle.

FIG. 4 shows an exemplary illustration of another method of dividing the original visual data-containing image into multiple sub-images, this time through the use of splines or other patterns to create irregularly shaped pieces that fit together to form the whole. In particular, again the original image contains the data for the user to recognize in step 38. The image is then divided in such a way that the upper left, upper right, lower left, and lower right sections are separated from one another, and through the use of transparencies an interlocking pattern is associated with each of the sections.

separate sub-images are presented to the user in a DHTML web page after being shuffled in step 40. Using the mouse to drag and drop the sections, the user positions the upper left (step 42), lower left (step 44), upper right 46, and lower right 48 sub-images so that the data contained within the original image can be seen. After reassembly the user inputs the data contained within the reassembled image, said inputted data then being compared by the system against the data contained in the original image in order to determine if the user is a human or a bot.

Figure 5:
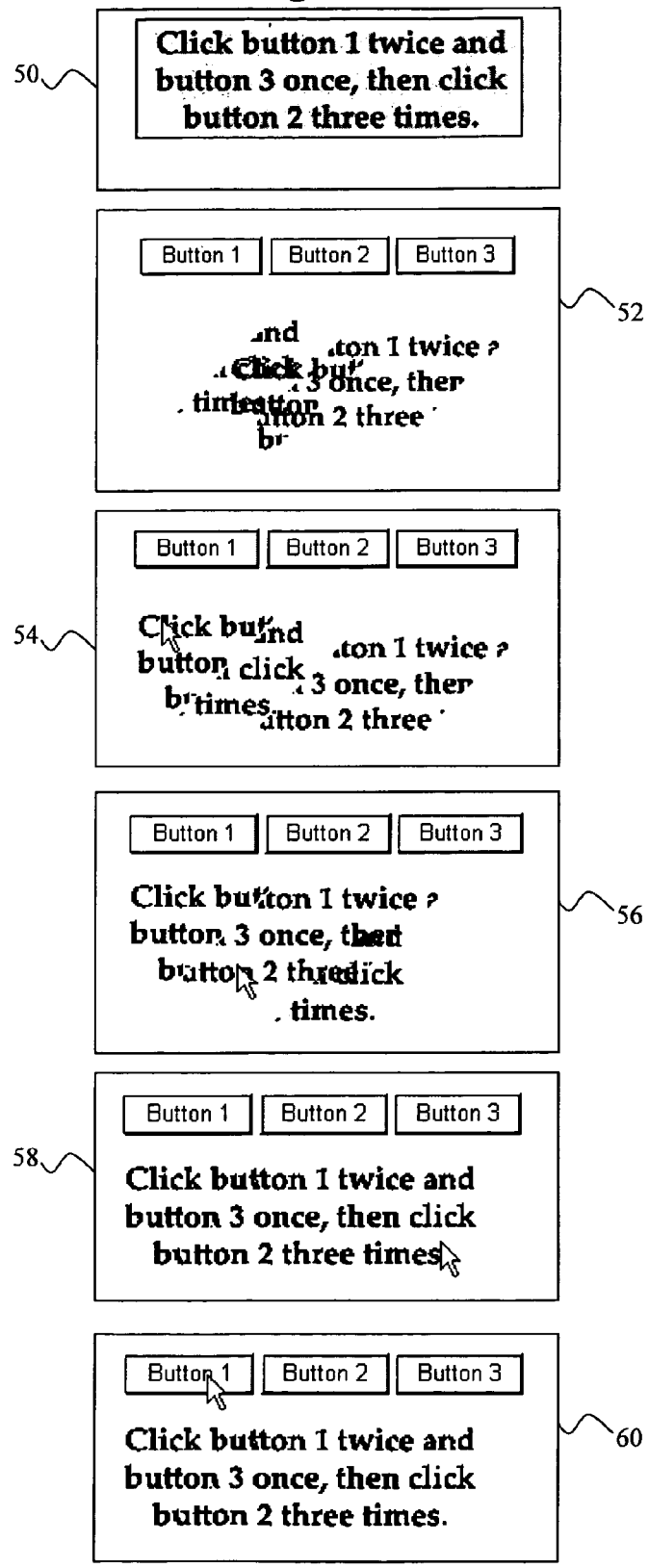
FIG. 5 shows an exemplary method, in accordance with another aspect of the invention, of how a generated image containing reference data, with the reference data being in the form of instructions, might be presented to the user after being divided in such a way that the various sub-images are sliced into diagonal sections.

FIG. 5 shows an exemplary illustration of another method of dividing the original visual data-containing image into multiple sub-images by dividing the image into diagonal slices. In particular, the original image contains instructions for the user to recognize and follow (step 50). The image is then divided in such a way that the left, middle, and right sections are separated from one another into diagonal shapes.

separate sub-images are presented to the user in a DHTML web page after being shuffled, along with three HTML buttons step 52. Using the mouse to drag and drop the sections, the user positions the left section step 54, middle section step 56, and right section 58 so that the data contained within the original image, in the form of instructions for the user to follow, can be seen.

reassembly the user follows the instructions contained within the reassembled image 60. The user's actions are then compared by the system against the data contained in the original image in order to determine if the user is human or bot.

Thus, methods of distinguishing a human user from a machine, or bot, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

I claim:

1. A method of a computer determining that an applicant seeking access to said computer is a human applicant, the method comprising the steps of:
   selecting by said computer an image containing human-readable data;
   dividing by said computer said image into a plurality of separated sub-images;
   presenting by said computer said plurality of separated sub-images to said applicant by a graphical user interface, said graphical user interface allowing said human applicant to manipulate at least one of a position, an orientation, or a size of at least one of said plurality of separated sub-images, whereby, said plurality of separated sub-images forms a reassembled image, said reassembled image containing human-readable data;
   said human applicant following the steps comprising of:
   recognizing by said human applicant a feature of said reassembled image, said feature comprising human-readable data, said human applicant responding to said human-readable data by performing the step of inputting said human-readable data to said computer to be authenticated;
   said computer verifying that said applicant is said human applicant only if said applicant provides an input responsive to recognition of said human-readable data;
   determining by said computer that said applicant is said human applicant, whereby, if said response is correct to allow access to said computer; and, determining by said computer that said applicant is said human applicant, whereby, if said response is incorrect to deny access to said computer.

2. The method of claim 1 wherein the graphical user interface comprises a portion of a second computer.

3. A method of a computer system determining that an applicant seeking access to said computer system is a human applicant, the method comprising the steps of:
   generating by said computer system a computer file representative of a plurality of separated sub-images that can be combined by said human applicant to yield an image containing human-readable data;
   displaying by said computer system said plurality of separated sub-images on a graphical user interface accessible to said applicant, whereby, said graphical user interface is operable by said human applicant to combine said plurality of separated sub-images, in accordance with said human applicant's manipulation thereof to yield said image containing human-readable data;
   said human applicant following the steps comprising of:
   recognizing by said human applicant said human-readable data contained within said image;
   submitting by said human applicant a response based on a visual recognition of said human-readable data;
   said computer verifying that said applicant is said human applicant only if said applicant supplies an input responsive to said human-readable data;
   determining by said computer system that said applicant is said human applicant, whereby, if said response is correct to allow access to said computer; and, determining by said computer system that said applicant is said human applicant, whereby, if said response is incorrect to deny access to said computer.

4. The method of claim 3 wherein the computer system comprises a single computer comprising the graphical user interface and wherein the file representative of a plurality of sub-images is generated by means of an algorithm running on the computer.

5. The method of claim 3 wherein the computer system comprises at least two computers wherein the computer file representative of a plurality of separated sub-images is generated by an algorithm running on a first of the computers and the input responsive to the human readable data is entered at a second of the at least two computers.

6. The method of claim 3 wherein the input responsive to the human-readable data comprises at least a portion of the human-readable data.

7. A method of a computer system determining that an applicant seeking access to said computer system is not human and thereupon denying the requested access, the method comprising the steps of:
   generating by said computer system a first data set representative of an image containing human-readable data;
   generating by said computer system a second data set representative of a plurality of separated sub-images of said image containing human-readable data, whereby, said plurality of separated sub-images are separated from each other by at least one of translation, rotation, overlay, or change of size;
   supplying by said computer system said second data set to a graphical user interface operable by said human applicant to reassemble said image containing human-readable data by said human applicant manipulating at least one of said plurality of separated sub-images;
   said human applicant following the steps comprising of:
   recognizing by said human applicant a feature on said reassembled image, said feature comprising human-readable data, said human applicant responding to said human-readable data by performing the step of inputting said human-readable data on said computer to be authenticated;
   said computer verifying that said applicant is said human applicant only if said applicant provides an input responsive to recognition of said human-readable data;
   determining by said computer system if said applicant is not human, whereby, if said response is correct to allow access to said computer; and, determining by said computer system if said applicant is not human, whereby, if said response is incorrect to deny access to said computer.

8. The method of claim 7 wherein the first and second data sets are generated on a first computer and are transmitted to a second computer comprising the graphical user interface used by the applicant.

9. A method of a computer determining that an applicant seeking access to said computer is a human applicant, the method comprising the steps of:
   selecting by said computer an image containing human-readable data;
   dividing by said computer said image into a plurality of separated sub-images;

presenting by said computer said plurality of separated sub-images to said applicant by a graphical user interface, said graphical user interface allowing said human applicant to manipulate at least one of a position, an orientation, or a size of at least one of said plurality of separated sub-images, whereby, said plurality of separated sub-images forms a reassembled image, said reassembled image containing human-readable data;

said human applicant following the steps comprising of:

recognizing by said human applicant instructions on said reassembled image, said human applicant responding to said instructions by following the steps of said instructions;

said computer verifying that an applicant is said human applicant only if said applicant follows said steps of said instructions;

determining by said computer that said applicant is said human applicant, whereby, if said response is correct to allow access to said computer; and, determining by said computer that said applicant is said human applicant, whereby, if said response is incorrect to deny access to said computer.

10. The method of claim 9 wherein following said steps of said instructions comprises said human applicant performing an interaction on said computer.

11. The method of claim 9 wherein following said steps of said instructions comprises said human applicant performing said step of inputting said human-readable data to said computer.

12. The method of claim 7 wherein said human-readable data comprises instructions and wherein the input responsive to recognition comprises said human applicant following said instructions.

* * * * *

UNITED STATES PATENT AND TRADEMARK OFFICE
CERTIFICATE OF CORRECTION

PATENT NO. : 8,627,419 B1  
APPLICATION NO. : 12/122628  
DATED : January 7, 2014  
INVENTOR(S) : Michael J VanDeMar It is certified that error appears in the above-identified patent and that said Letters Patent is hereby corrected as shown below:

In the Specifications

Col. 4, line 26: The sentence should read "These separate sub-images are presented to the user for reassembly by positioning the sub-image created from the horizontal middle portion of the original image directly over the sub-image that has the middle section removed."

Col. 4, line 44: The sentence should read "These separate sub-images are presented to the user in a DHTML web page after being shuffled in step 40."

Col. 4, line 61: The sentence should read "These separate sub-images are presented to the user in a DHTML web page after being shuffled, along with three HTML buttons step 52."

Col. 5, line 1: The sentence should read "After reassembly the user follows the instructions contained within the reassembled image 60."

Signed and Sealed this  
Twenty-ninth Day of April, 2014

Michelle K. Lee  
*Deputy Director of the United States Patent and Trademark Office*